United States Patent
Gates et al.

(10) Patent No.: US 7,783,686 B2
(45) Date of Patent: *Aug. 24, 2010

(54) APPLICATION PROGRAM INTERFACE TO MANAGE MEDIA FILES

(75) Inventors: Matthijs A. Gates, Wellesley, MA (US); Kenneth Reneris, Redmond, WA (US); Dale Sather, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/454,409

(22) Filed: Jun. 16, 2006

(65) Prior Publication Data

US 2007/0294311 A1      Dec. 20, 2007

(51) Int. Cl.
*G06F 17/30* (2006.01)
(52) U.S. Cl. ........................ 707/829; 707/831
(58) Field of Classification Search ............ 707/200, 707/205
See application file for complete search history.

(56) References Cited

U.S. PATENT DOCUMENTS

| | | | |
|---|---|---|---|
| 5,537,592 A | 7/1996 | King et al. | |
| 5,634,050 A | 5/1997 | Krueger et al. | |
| 5,655,117 A | 8/1997 | Goldberg et al. | |
| 5,815,703 A | 9/1998 | Copeland et al. | |
| 5,819,292 A | 10/1998 | Hitz et al. | |
| 5,940,838 A | 8/1999 | Schmuck et al. | |
| 5,960,446 A * | 9/1999 | Schmuck et al. | 707/205 |
| 5,963,963 A * | 10/1999 | Schmuck et al. | 707/205 |
| 5,987,477 A * | 11/1999 | Schmuck et al. | 707/201 |
| 6,128,713 A | 10/2000 | Eisler et al. | |
| 6,205,457 B1 | 3/2001 | Hurwitz | |
| 6,208,999 B1 | 3/2001 | Spilo et al. | |
| 6,269,254 B1 * | 7/2001 | Mathis | 455/557 |
| 6,324,581 B1 | 11/2001 | Xu et al. | |
| 6,356,915 B1 * | 3/2002 | Chtchetkine et al. | 707/200 |
| 6,363,400 B1 * | 3/2002 | Chtchetkine et al. | 707/200 |
| 6,430,549 B1 * | 8/2002 | Gershfield et al. | 707/2 |
| 6,499,039 B1 | 12/2002 | Venkatesh et al. | |
| 6,523,046 B2 | 2/2003 | Liu et al. | |
| 6,578,029 B2 * | 6/2003 | Gershfield et al. | 707/2 |
| 6,718,445 B1 | 4/2004 | Lewis et al. | |
| 6,738,875 B1 | 5/2004 | Wang et al. | |
| 6,745,207 B2 * | 6/2004 | Reuter et al. | 707/200 |
| 6,751,623 B1 | 6/2004 | Basso et al. | |
| 6,886,033 B1 | 4/2005 | Brush et al. | |
| 6,928,444 B2 | 8/2005 | Richard | |
| 6,983,467 B2 | 1/2006 | Engstrom et al. | |

(Continued)

OTHER PUBLICATIONS

International Search Report PCT/US2007/011771, dated Nov. 6, 2007, pp. 1-8.

(Continued)

*Primary Examiner*—Don Wong
*Assistant Examiner*—Kim T Nguyen

(57) ABSTRACT

An application program interface to manage media files may be described. An apparatus may comprise a media processing sub-system having a processor and a memory. The memory may store an application program interface software library having multiple software objects. The processor may execute the software objects in response to application program interface commands in order to manage a virtual file comprising a hierarchy of name-value pairs used to store media content from multiple media streams. Other embodiments are described and claimed.

20 Claims, 8 Drawing Sheets

U.S. PATENT DOCUMENTS

| | | | |
|---|---|---|---|
| 7,007,046 | B2 | 2/2006 | Manley et al. |
| 7,051,064 | B1 | 5/2006 | Yamagishi et al. |
| 7,392,481 | B2* | 6/2008 | Gewickey et al. ........... 715/716 |
| 2002/0056031 | A1* | 5/2002 | Skiba et al. ................. 711/162 |
| 2002/0059623 | A1 | 5/2002 | Rodriguez et al. |
| 2002/0136406 | A1 | 9/2002 | Fitzhardinge et al. |
| 2002/0162047 | A1 | 10/2002 | Peters et al. |
| 2003/0115218 | A1* | 6/2003 | Bobbitt et al. .............. 707/200 |
| 2003/0172196 | A1 | 9/2003 | Hejlsberg et al. |
| 2003/0212712 | A1 | 11/2003 | Gu et al. |
| 2004/0003008 | A1 | 1/2004 | Wasilewski et al. |
| 2004/0028042 | A1 | 2/2004 | Srinivasan et al. |
| 2004/0111439 | A1 | 6/2004 | Richardson et al. |
| 2004/0153479 | A1 | 8/2004 | Mikesell et al. |
| 2004/0177371 | A1 | 9/2004 | Caspi et al. |
| 2004/0213103 | A1 | 10/2004 | Wu et al. |
| 2005/0033776 | A1* | 2/2005 | Kircher et al. .............. 707/200 |
| 2005/0091287 | A1 | 4/2005 | Sedlar |
| 2005/0108240 | A1 | 5/2005 | Bolosky et al. |
| 2005/0108295 | A1* | 5/2005 | Karimisetty et al. ........ 707/200 |
| 2005/0114338 | A1 | 5/2005 | Borthakur et al. |
| 2005/0144501 | A1 | 6/2005 | Kim et al. |
| 2005/0262325 | A1 | 11/2005 | Shmueli et al. |
| 2006/0015482 | A1* | 1/2006 | Beyer et al. ..................... 707/3 |
| 2006/0031889 | A1 | 2/2006 | Bennett et al. |
| 2006/0041679 | A1 | 2/2006 | Feig |
| 2006/0064536 | A1 | 3/2006 | Tinker et al. |
| 2007/0005616 | A1 | 1/2007 | Hay et al. |
| 2007/0185881 | A1* | 8/2007 | Vienneau et al. .............. 707/10 |
| 2008/0040746 | A1 | 2/2008 | Shae et al. |
| 2008/0049621 | A1 | 2/2008 | McGuire et al. |
| 2008/0086751 | A1 | 4/2008 | Horn et al. |

OTHER PUBLICATIONS

Bencina, Ross, et al., "PortAudio—an Open Source Cross Platform Audio API", http://www.audiomulch.com/~rossb/articles/portaudio_icmc2001.pdf.

Childs, Stephen, "Filing system interfaces to support distributed multimedia applications", http://delivery.acm.org/10.1145/320000/319220/p162-childs.pdf?key1=319220&key2=3903643411&coll=GUIDE&dl=GUIDE&CFID=68241410&CFTOKEN=49794354.

Loganthan, Vignesh, "Flexible and Scalable Movie Architecture for DSP based DSC/DM Systems", http://www.techonline.com/community/tech_group/38783.

Becina, Ross, et al., "PortAudio—an Open Source Cross Platform Audio API", http://www.audiomulch.com/~rossb/articles/portaudio_icmc2001.pdf.

Childs, Stephen, "Filing system interfaces to support distributed multimedia applications", http://delivery.acm.org/10.1145/320000/319220/p162-childs.pdf?key1=3199220&key2=3903643411&coll=GUIDE&dl=GUIDE&CFID=68241410&CFTOKEN=49794354.

Loganthan, Vignesh, "Flexible and Scalable Movie Architecture for DSP based DCM/DM Systems", http://www.techonline.com/community/tech_group/38783.

Muthitacharoen, Athicha, et al., "Ivy: A Read/Write Peer-to-Peer File System", MIT Laboratory for Computer Science.

Rosenblum, Mendel, et al., "The Design and Implementation of a Log-Structured File System", ACM Transactions on Computer Systems, 1, Feb. 1992, pp. 26-52, vol. 10.

Prabhakaran, Vijayan, et al., "IRON File Systems", Computer Sciences Department, University of Wisconsin, Madison, Oct., 2005.

Skarra, Andrea, et al., "A File System Interface for Concurrent Access", AT&T Bell Laboratories.

* cited by examiner

APPLICATION PROGRAM INTERFACE TO MANAGE MEDIA FILES

CROSS REFERENCE TO RELATED APPLICATION

This application is related to U.S. patent application Ser. No. 11/454,686 titled "Techniques to Manage Media Files," and filed on Jun. 16, 2006, the entirety of which is hereby incorporated by reference.

BACKGROUND

Media devices such as a personal video recorder or digital video recorder may be used to store and reproduce digital media content. Examples of digital media content may include television programs, movies, home videos, songs, images, pictures, and so forth. The digital media content may be received from various media sources, such as a cable provider, a satellite provider, a digital versatile disk (DVD) player, a compact disk (CD) player, a digital video home system, a media content provider over an Internet connection, computer files, and so forth. As a result, a media device may need to store an ever-increasing volume of media content from different media sources using multiple files and file types. This may significantly increase file management operations, file structure complexity, and associated costs. Consequently, improved file management techniques may be needed to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to media systems. Some embodiments may be directed to file management techniques for media systems in particular. In one embodiment, for example, a media processing system or subsystem may include a processor, a memory, and a communications interface. The memory may be used to store a media file manager for execution by the processor. The media file manager may be used to implement a file allocation scheme for allocating space in a virtual file for various use scenarios, such as storing multiple media streams and/or media files into a single virtual file.

Various embodiments may further include a software library of software objects and defined application program interface (API) commands to support an API layer to access and manage virtual files. The API layer may allow various custom applications to utilize the file allocation scheme implemented using the media file manager. The API layer may be used in conjunction with the media file manager, separate from the media file manager, or in lieu of the media file manager, as desired for a given implementation.

In operation, the media processing system may receive multiple media streams of media information from various media sources over one or more communications interfaces. The media file manager may store the multiple media streams in physical memory with a single virtual file using a hierarchy of name-value pairs. The single virtual file may have a logical file format that is different from the physical file format used to store the virtual file. For example, the physical file format may store portions of the virtual file using non-contiguous and/or non-sequential portions of physical memory. In this manner, multiple media streams or media files may be stored using a single virtual file, thereby decreasing file complexity and file management operations. Other embodiments are described and claimed.

DETAILED DESCRIPTION

Figure 1:
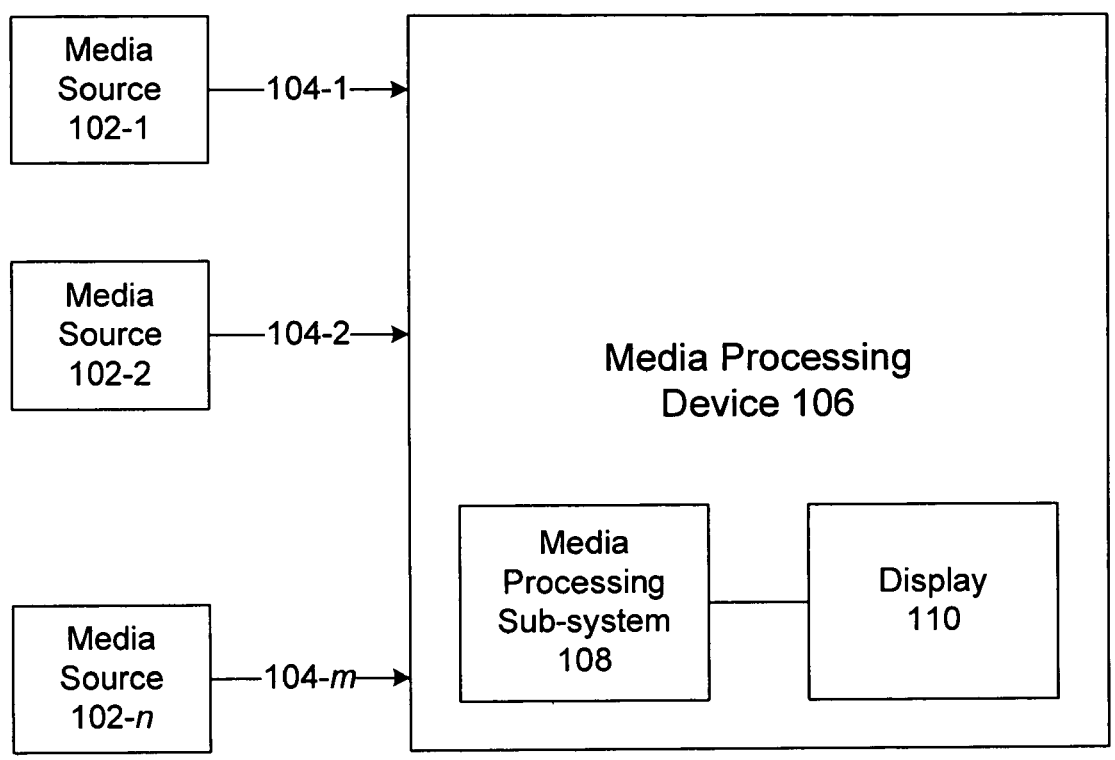
FIG. 1 illustrates an exemplary embodiment of a media system.

Various embodiments may be directed to an application program interface (API) layer to support a file allocation scheme that may be used to store, retrieve, or otherwise manage media content using any form of machine-readable or computer-readable media, such as on-disk storage, for example. The file allocation scheme may be used to store various types of media content received from various media sources into a single uniform file structure comprising a single virtual file. In some cases, the virtual file may have a logical file structure that is different from the physical file structure used to actually store the media content, thereby releasing the virtual file from physical constraints and requirements. The file allocation scheme is particularly well-suited for PVR and multimedia applications, given the relatively larger volumes of media content associated with television programs and movies, for example. The file allocation scheme, however, is very flexible and extensible and is not necessarily bound to PVR or multimedia applications. The file allocation scheme may be used as an on-disk storage container for many applications and use scenarios. Because it is not tightly integrated with any one given type of application and therefore very extensible, the file allocation scheme may be applicable to any form of current and future applications having to manage larger volumes of data.

In various embodiments, the file allocation scheme provides a file allocation layer for a media file format in order to manage space in a file. In some embodiments, the file allocation scheme includes various design features, such as supporting basic file semantics, supporting file integrity and crash recoverability, supporting multiple writers and multiple readers concurrently, allowing backward compatibility with older versions and enforcing the performance requirements of a given media, and allowing large name-value pairs to grow independently. The file allocation scheme may also include other design features as desired for a given implementation.

Various embodiments may include an API layer to support the file allocation layer. The API layer may include an API software library of software objects and a set of defined API commands. Various application programs may use the API commands to invoke various software objects to perform desired file management operations in accordance with the file allocation scheme described herein. In particular, the file allocation API layer models various file allocation functions, methods, services, or procedures. In one embodiment, for example, the API layer may model signatures and versions in a file header for a virtual file, allocation statistics regarding a virtual file, a hierarchy of name-value pairs in a virtual file (including the ability to create and delete name-value pairs), short and long values modeled as virtual files, the ability to zero ranges in a short or long value, the explicit locking of short and long values for reading and writing, and the subscription to events indicating when values have changed. Other file allocation functions, methods, services, or procedures may be modeled as well, and the embodiments are not limited in this context. Various API commands and corresponding software objects suitable to support the file allocation layer may be later described with reference to FIG. 8.

File Allocation Layer

FIG. 1 illustrates a block diagram for a media system 100. Media system 100 may represent a general system architecture suitable for implementing various embodiments. Media system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although media system 100 as shown in FIG. 1 has a limited number of elements in a certain topology, it may be appreciated that media system 100 may include more or less elements in alternate topologies as desired for a given implementation. The embodiments are not limited in this context.

In various embodiments, media system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a device to process the media information in a predetermined manner, and so forth.

In various embodiments, media system 100 may include media sources 102-1-$n$. Media sources 102-1-$n$ may comprise any physical or logical entity capable of sourcing or delivering media information (e.g., digital video signals, audio signals, and so forth) and/or control information to media processing device 106. Examples of media sources 102-1-$n$ may include a DVD device, a VHS device, a digital VHS device, a personal video recorder (PVR), a digital video recorder (DVR), a computer, a gaming console, a CD player, a digital camera, a digital camcorder, and so forth. Other examples of media sources 102-1-$n$ may include media distribution systems to provide broadcast or streaming analog or digital media information to media processing device 106. Examples of media distribution systems may include, for example, over the air (OTA) broadcast systems, terrestrial cable systems (CATV), satellite broadcast systems, and so forth. Media sources 102-1-$n$ may be internal or external to media processing device 106 as desired for a given implementation.

In various embodiments, media system 100 may comprise a media processing device 106 to connect to one or more media sources 102-1-$n$ over one or more communications media 104-1-$m$. Media processing device 106 may comprise any logical or physical entity that is arranged to process media information received from media sources 102-1-$n$. In various embodiments, media processing device 106 may comprise, or be implemented as, a computing device, such as a computer, a set top box (STB), a media server, a desktop computer, a personal computer (PC), a laptop computer, a handheld computer, a home entertainment system, a home theater system, and so forth.

In various embodiments, media processing device 106 may include a media processing sub-system 108. Media processing sub-system 108 may comprise a processor, memory, and application hardware and/or software arranged to process media information received from media sources 102-1-$n$. For example, media processing sub-system 108 may be arranged to perform various media management operations, such as receiving media information, storing media information, recording media information, playing media information, performing trick mode operations for media information, performing seek operations for media information, and so forth. Media processing sub-system 108 may output processed media information to a display 110. Display 110 may be any display capable of displaying media information received from media sources 102-1-$n$.

Figure 2:
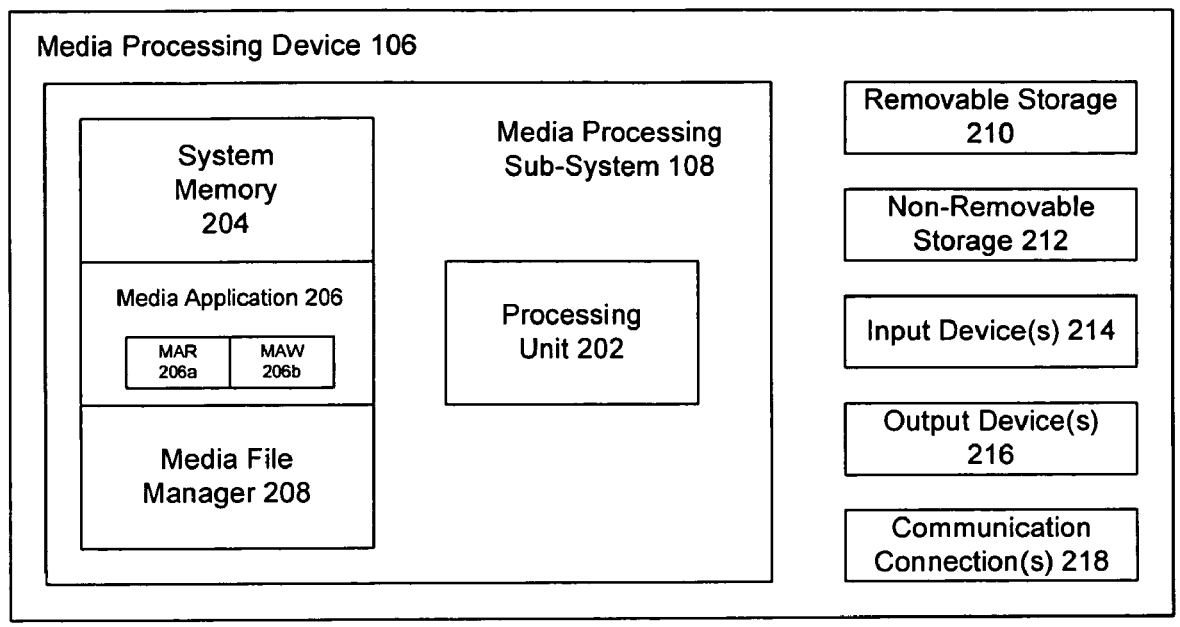
FIG. 2 illustrates an exemplary embodiment of a media processing device.

FIG. 2 illustrates a more detailed block diagram of media processing device 106. In its most basic configuration, media processing device 106 typically includes at least one processing unit 202 and memory 204. Processing unit 202 may be any type of processor capable of executing software, such as a general-purpose processor, a dedicated processor, a media processor, a controller, a microcontroller, an embedded processor, a digital signal processor (DSP), and so forth. Memory 204 may be implemented using any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 1, memory 204 may store various software programs, such as one or more media applications 206 (including media application reader 206a and media application writer 206b), a media file manager 208, and accompanying data.

Media processing device 106 may also have additional features and/or functionality beyond configuration 106. For example, media processing device 106 may include removable storage 210 and non-removable storage 212, which may also comprise various types of machine-readable or computer-readable media as previously described. Media processing device 106 may also have one or more input devices 214 such as a keyboard, mouse, pen, voice input device, touch input device, and so forth. One or more output devices 216 such as a display (e.g., display 110), speakers, printer, and so forth may also be included in media processing device 106 as well.

Media processing device 106 may further include one or more communications connections 218 that allow media processing device 106 to communicate with other devices. Communications connections 218 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

In general operation, media processing device 106 may receive and store various types of media information from one or more media sources 102-1-n via communications connections 218. Media processing device 106 may store the media information using storage 210, 212, for example. Media file manager 208 may store media information from multiple media streams in physical memory with a single virtual file using a hierarchy of name-value pairs. The single virtual file may have a logical file format that is different from the physical file format used to store the virtual file. For example, the physical file format may store portions of the virtual file using non-contiguous portions of memory from storage 210, 212. In other words, the logical file structure is disconnected from the physical file structure. In this manner, media file manager 208 may coalesce multiple media files into a single virtual file, thereby decreasing file complexity and file management operations. Media processing device 106 in general, and media file manager 208 in particular, may be further described with reference to FIGS. 3-8 and accompanying examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
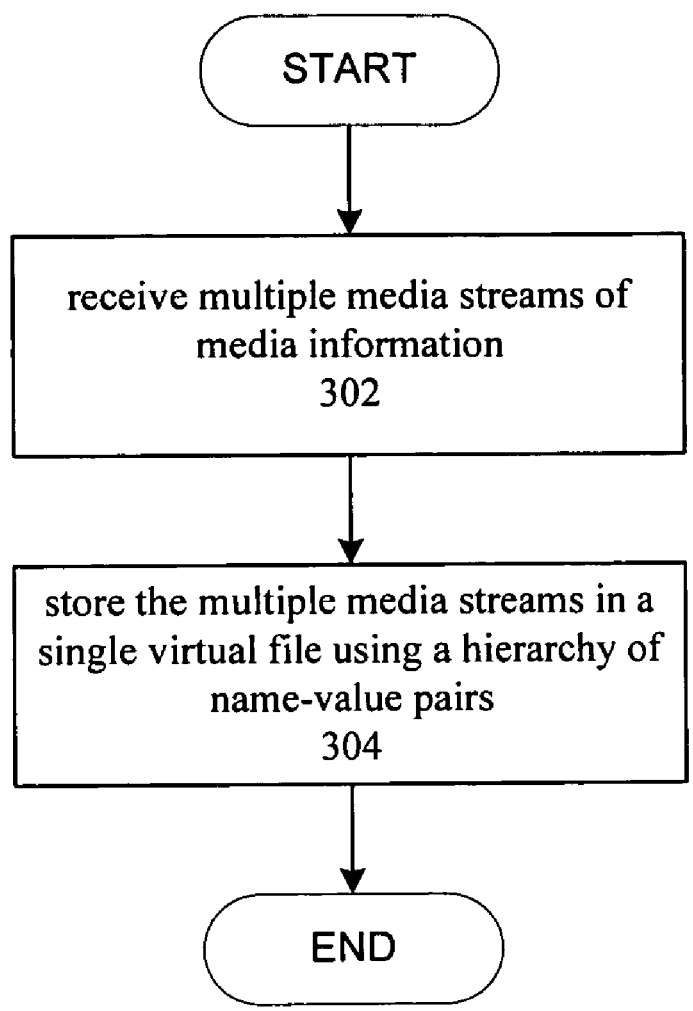
FIG. 3 illustrates an exemplary embodiment of a logic flow.

FIG. 3 illustrates one embodiment of a logic flow 300. Logic flow 300 may be representative of the operations executed by one or more embodiments described herein, such as media system 100, media processing device 106, and/or media processing sub-system 108. As shown in FIG. 3, multiple media streams of media information may be received at block 302. The multiple media streams may be stored in a single virtual file using a hierarchy of name-value pairs (NVPs) at block 304. The embodiments are not limited in this context.

Media file manager 208 of media processing sub-system 108 may be arranged to implement a file allocation scheme for allocating space in a virtual file, such as a virtual media file. The virtual file may comprise, for example, multiple NVPs in one or more containers. A NVP may represent a specific binding between a name and a binary value. One specific type of container may be referred to as a root container. A root container may comprise the highest-level container in a given file.

A NVP may comprise an NVP name and an NVP value. The NVP name may comprise a globally unique identifier (GUID), file name, text name, string, or some other unique file identifier. The NVP value may comprise several types of values, including a resident value, a short value, or a long value. The different types of NVP values provide distinctions that have performance and efficiency implications with regard to value size. Resident values are stored in-band, adjacent to corresponding NVP names. Short values are stored using a page table technique that implements a virtual file comprising multiple short pages. Short pages may refer to the shorter of two allocation units in a file of a defined length. A page table may comprise an array of long pages or short pages implemented using a tree of fixed-length arrays of page references, referred to as table pages as contained in short pages. Long values are stored using the same or similar page table technique applied to long pages. A long page may refer to the longer of two allocation units in a file of a defined length.

In various embodiments, media file manager 208 may partition a virtual file into long pages, the length of which is determined when the file is created. A typical long page size might be 256 k bytes, for example. A given long page may be partitioned into a number of short pages, the length of which is also determined when the file is created. A typical short page size might be 4 k bytes, for example. All long pages should be partitioned in a consistent manner to ensure file integrity. New long pages are allocated at the end of the file. Long pages can also be allocated from the SAL_File Header FreeLongPages page table. If the page table is empty, pages are allocated at the end of the file (e.g., the file is grown). New short pages are allocated by first allocating a long page and then allocating short pages from it.

In general, page sizes may have various design constraints. For example, short and long page sizes (as expressed in bytes) are typically a power of two. In another example, long pages are generally longer than short pages. In yet another example, short pages are typically at least as long as a file header. In still another example, the overall file size is typically limited to 4,294,967,296 times the short page size (e.g., 16 terabytes if the short page size is 4 k bytes).

Pages are referenced by their offset values into the file as expressed in short pages. Hence, the first short page in the file has the reference 0, as does the first long page in the file. The second short page in the file has the reference 1, while the second long page has a reference equal to the long page size divided by the short page size. For example, the second long page may have a reference value of 64 given the values in the previous scenario (e.g., 256 k/4 k=64).

In various embodiments, the first long page in the file is always partitioned into short pages. The first short page in the file typically contains only the file header. For example, media file manager 208 may store a file header for a virtual file in a first short page of the virtual file. The file header contains signatures and versions, page sizes, the page table for the root container and various fields concerning free space management in the file. Media file manager 208 may use two defined signature GUIDs. The first signature GUID indicates that the file complies with the format described herein. The second signature GUID is used by an application to indicate how the file is formatted at the next layer. Two version numbers are also defined for backward-compatible revisions of the format at both layers.

The root container is a short value containing the highest-level NVPs in the virtual file. A short value may comprise a page table of short pages. Some of the values of those NVPs may be containers themselves, so NVPs may form a hierarchy of arbitrary depth. An example of a file header may be illustrated as follows:

```
typedef struct SAL_FILE_HEADER {
    GUID       SALSignature;        // Identifies the format at this layer
    GUID       ApplicationSignature; // Identifies the format at the next layer
    ULONG      SALVersion;          // The version of the format at this layer
    ULONG      ApplicationVersion;  // The version of the format at the next layer
    ULONG      ShortPageSize;       // Short page size in bytes.
    ULONG      LongPageSize;        // Long page size in bytes.
    ULONGLONG  RootContainerSize;   // Length of the root container in bytes.
    PageTable  RootContainer;       // A 'short' value containing NVPs
    ULONG      FreeShortPageCount;  // Number of pages in the FreeShortPages table
    ULONG      FreeLongPageCount;   // Number of pages in the FreeLongPages table
    PageTable  FreeShortPages;      // The table of recycled short pages
    PageTable  FreeLongPages;       // The table of recycled long pages
    PAGEREF    FirstFreeShortPage;  // The next short page to be allocated
    PAGEREF    FirstFreeLongPage;   // The next long page to be allocated
} SAL_FILE_HEADER
```

NVPs are stored in containers, either the root container or the value of some other NVP. They bind a GUID or text name to a binary value. NVPs are stored one after the other starting at the beginning of the container. In one embodiment, for example, they are padded to 64-bit boundaries. The end of the collection of NVPs in a container is indicated either by encountering the end of the container, or by an NVP with a label of GUID_NULL and a ValueSize of zero. An NVP can be effectively deleted by setting its label to GUID_NULL. Example type definitions for a NVP are shown as follows:

```
typedef struct SAL_GUID_NVP_HEADER {
    GUID       Name;         // GUID_NULL indicates an unused NVP.
    ULONG      NvpSize ;     // Nvp size
    ULONG      PrefixSize ;  // prefix bytes
    ULONGLONG  ValueSize;    // unpadded size of value, top 4 bits stolen;
                             // does not include prefix bytes
                             // value or PageTable, padded to 64-bit boundary
} SAL_GUID_NVP_HEADER
typedef struct SAL_TEXT_NVP_HEADER {
    GUID       TextNvpGuid;  // Always TEXT_NVP_GUID
    ULONG      NvpSize ;     // Nvp size
    ULONG      PrefixSize ;  // prefix bytes
    ULONGLONG  ValueSize;    // unpadded size of value, top 4 bits stolen;
                             // does not include prefix bytes
    ULONG      NameSize;     // unpadded size of name (in WCHARs)
    ULONG      Reserved ;    // reserved (alignment)
                             // name, padded to 64-bit boundary with L'0' values
                             // value or PageTable, padded to 64-bit boundary
} SAL_TEXT_NVP_HEADER;
```

In some embodiments, the four highest bits of ValueSize may be used to provide information about a given NVP. For example, a NVP_FLAG_TEXT value indicates the NVP has a text name and that the header takes the form of a TextNvp-Header. A NVP_FLAG_CONTAINER value indicates that the NVP value contains more NVPs. A NVP_FLAG_SHORT value indicates the value is actually stored in a page table of short pages and that the value after the header is a PageTable structure. A NVP_FLAG_LONG indicates the value is actually stored in a page table of long pages and that the value after the header is a PageTable structure. An example of these definitions is shown as follows:

```
cpp_quote ("#define NVP_FLAG_TEXT          0x1000000000000000L")
cpp_quote ("#define NVP_FLAG_CONTAINER     0x2000000000000000L")
cpp_quote ("#define NVP_FLAG_RESIDENT      0x4000000000000000L")
cpp_quote ("#define NVP_FLAG_SHORT         0x8000000000000000L")
cpp_quote ("#define NVP_FLAG_RESERVED      0xc000000000000000L")
cpp_quote ("#define NVP_FLAG_MASK          0xf000000000000000L")
cpp_quote ("#define NVP_VALUE_MASK         (~NVP_FLAG_MASK)")
cpp_quote ("#define GET_VALUE_FROM_NVP_VALUESIZE_FIELD(valuefield)
   ((valuefield) & NVP_VALUE_MASK)")
cpp_quote ("#define GET_FLAGS_FROM_NVP_VALUESIZE_FIELD(valuefield)
   ((valuefield) & NVP_FLAG_MASK)")
cpp_quote ("#define FORM_NVP_VALUESIZE_FIELD(flags,value)
   (((flags) & NVP_FLAG_MASK) | ((value) & NVP_VALUE_MASK))")
cpp_quote ("#define FORM_NVP_VALUESIZE_FIELD_WITH_NEW_VALUE(valuefield,value)
   (FORM_NVP_VALUESIZE_FIELD(GET_FLAGS_FROM_NVP_VALUESIZE_FIELD(valuefield)
   ,(value)))")
cpp_quote ("#define FORM_NVP_VALUESIZE_FIELD_WITH_NEW_FLAGS(valuefield,flags)
   (FORM_NVP_VALUESIZE_FIELD((flags),GET_VALUE_FROM_NVP_VALUESIZE_FIELD(valuefield)))")
```

In some embodiments, the NVPs may be stored using a page table technique. A page table may comprise an array of long pages or short pages implemented using a tree of fixed-length arrays of page references, referred to as table pages as contained in short pages. The tree may be built, for example, having short pages referenced from a page table, table pages referenced from short pages, and data pages referenced from table pages.

Page tables take the form of a sparse array of data pages. Page tables of short pages are used to store "short" values. Page tables of long pages are used to store "long" values. In both cases, arrays are implemented as a hierarchy of fixed length tables in short pages. Each "table page" may comprise of page references, either to data pages or to other table pages. Some example page tables may be illustrated and described with reference to FIGS. 4-7.

Figure 4:
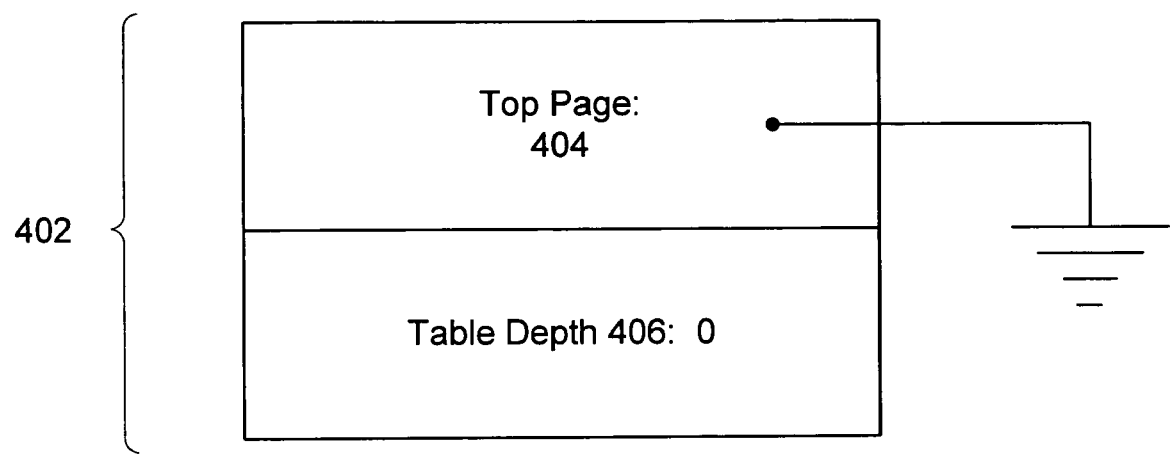
FIG. 4 illustrates an exemplary embodiment of a first page table.

FIG. 4 illustrates an exemplary embodiment of a first page table. FIG. 4 illustrates a page table 400. A root structure 402 for page table 400 may include a reference to the top page 404 and an integer table depth 406. An example of a type definition for a page table may be shown as follows:

```
typedef struct PageTable {
    PAGEREF TopPage;
    ULONG Depth;
} PageTable;
```

As shown in FIG. 4, page table 400 comprises a basic page table having a top page 404 with a null top page reference and a table depth 406 of 0. In this configuration, page table 400 represents a value consisting entirely of zeros. It is worthy to note that a page table typically has no length semantics. For example, page table 400 can represent a value consisting of any number of zeros.

Figure 5:
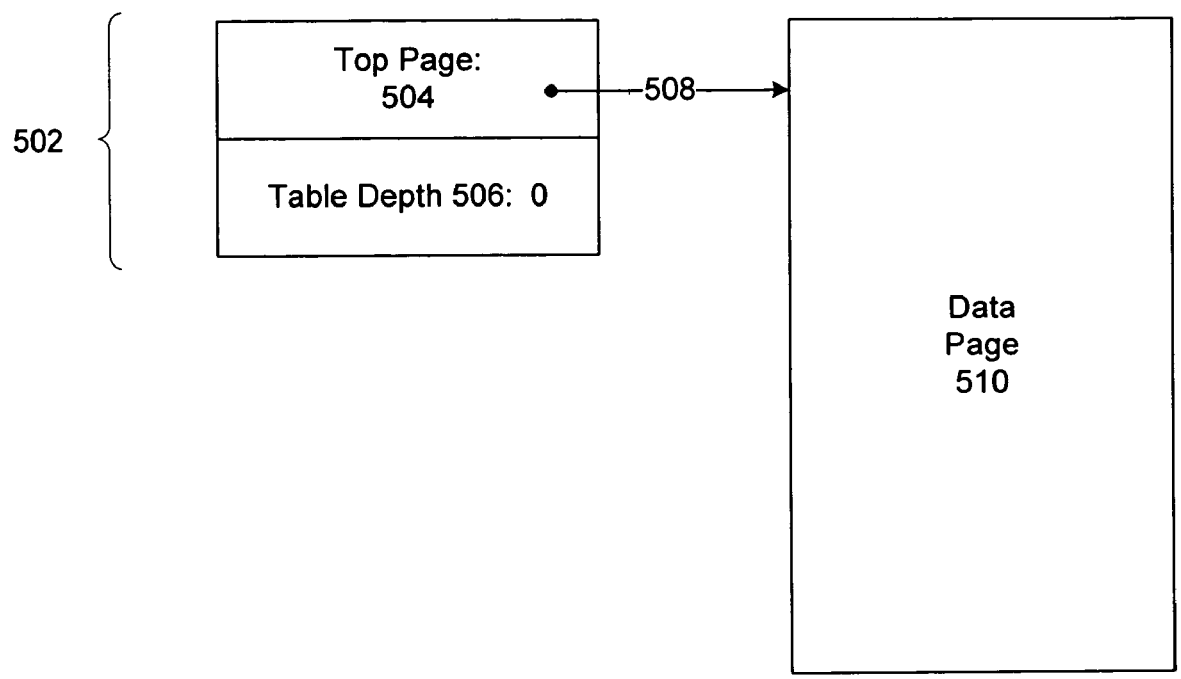
FIG. 5 illustrates an exemplary embodiment of a second page table.

FIG. 5 illustrates an exemplary embodiment of a second page table. FIG. 5 illustrates a page table 500. Page table 500 provides an example of a page table having a root structure 502 with a top page 504 referencing a single data page 510 as shown by arrow 508, and a table depth 506 of zero. The data in data page 510 is interpreted as occurring at an offset of 0 in the represented value.

Figure 6:
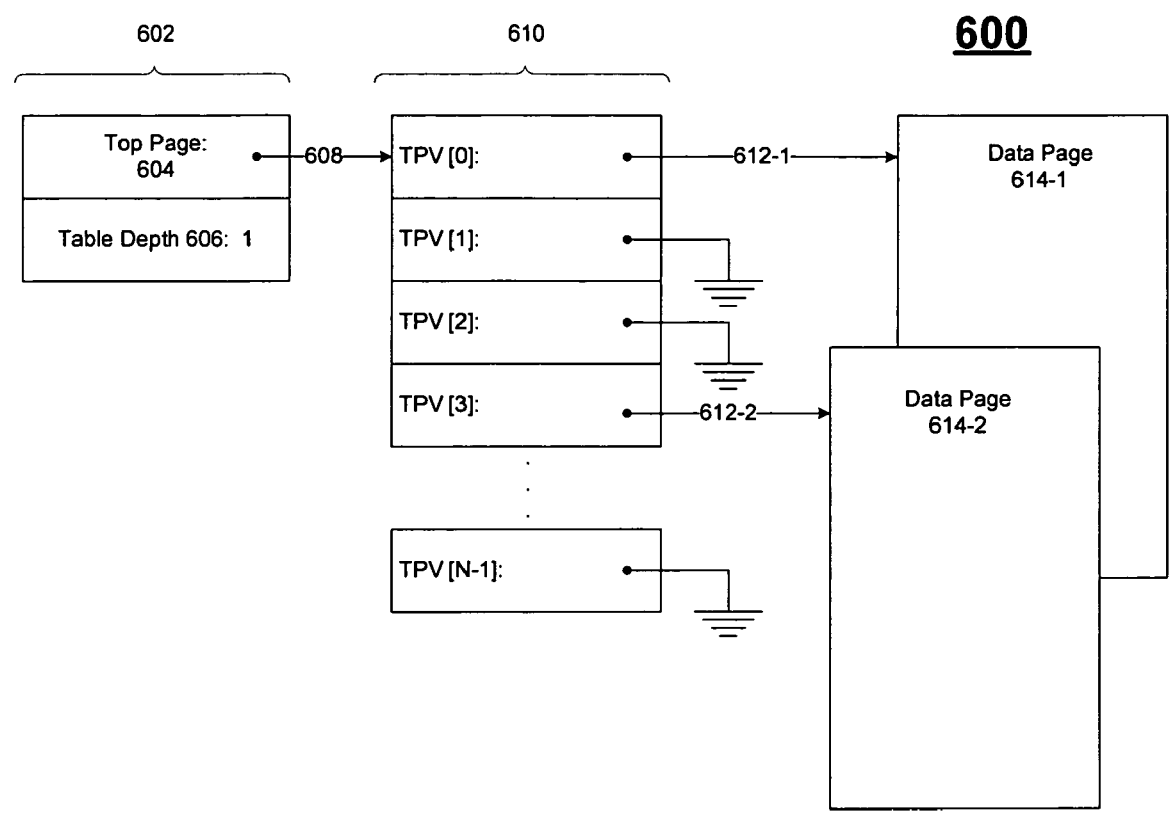
FIG. 6 illustrates an exemplary embodiment of a third page table.

FIG. 6 illustrates an exemplary embodiment of a third page table. FIG. 6 illustrates a page table 600. Page table 600 provides an example of a page table having a root structure 602 with a top page 604 referencing a single table page 610 as shown by arrow 608, and a table depth 606 of 1. At a table depth 606 of 1, table page 610 includes table page values (TPVs) of 0 to N−1 that may reference data pages or null references. As shown in FIG. 6, for example, page table 600 includes a TPV [0] with a reference 612-1 to a data page 614-1, and a TPV [3] with a reference 612-2 to a data page 614-2, with the remaining TPVs having null references.

Figure 7:
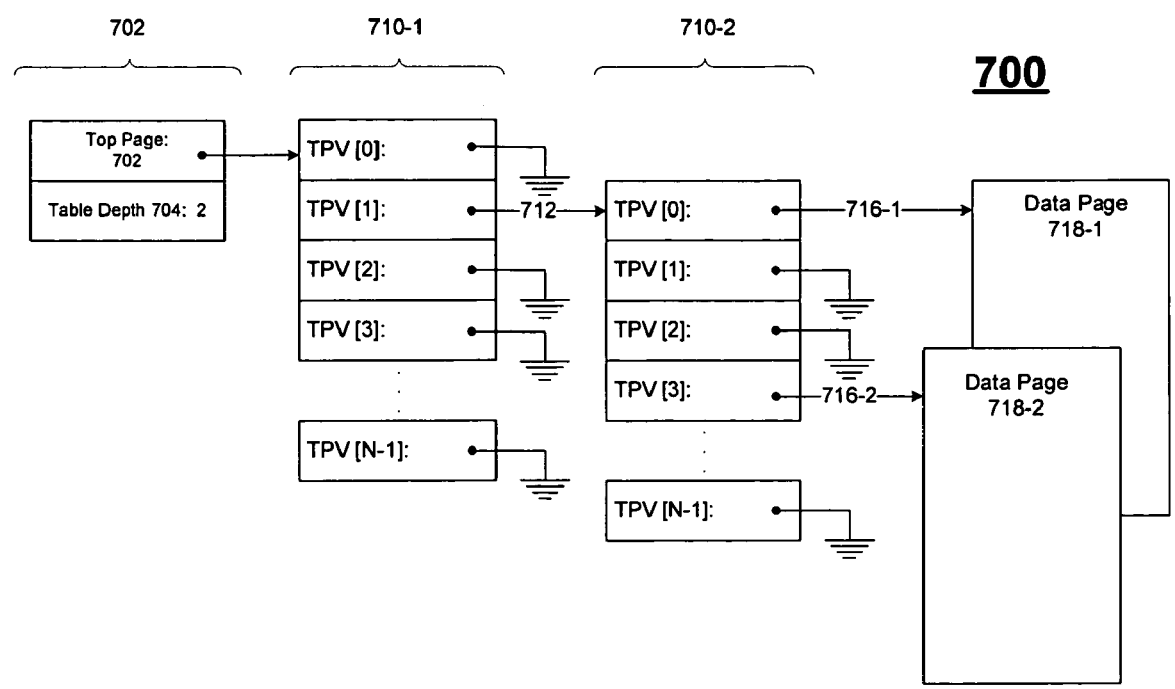
FIG. 7 illustrates an exemplary embodiment of a fourth page table.

FIG. 7 illustrates an exemplary embodiment of a fourth page table. FIG. 7 illustrates a page table 700. Page table 700 provides an example of a page table having a root structure 702 with a top page 704 referencing a first table page 710 as shown by arrow 708, and a table depth 706 of 2. At a table depth 706 of 2, first table page 710-1 includes TPVs of 0 to N−1 that may reference other table pages or null references. As shown in FIG. 7, for example, page table 700 includes a TPV [1] with a reference 712 to a second table page 710-2, with the remaining TPVs having null references. Second table page 710-2 may also include TPVs of 0 to N−1 that may reference data pages or null references. For example, second table page 710-2 may include a TPV [0] with a reference 716-1 to a data page 718-1, a TPV [3] with a reference 716-2 to a data page 718-2, with the remaining TPVs having null references. It may be appreciated that table pages 710-1, 710-2 may each have a table depth of 1. There are no defined limits to page table depth, but depths greater than 3 are atypical.

In various embodiments, media file manager 208 may manage free space for a virtual file using a first recycled page table and a second recycled page table for an array of short pages and long pages, respectively. Media file manager 208 manages free space in two similar but separate ways for short and long pages. There are two page tables of recycled pages, one for short pages and one for long pages. A first recycled page table may be referred to as Header.FreeShortPages, for example. The first recycled page table Header.FreeShortPages is always fully populated from index 0 to index Header.FreeShortPageCount. A second recycled page table may be referred to as Header.FreeLongPages, for example. The second recycled page table Header.FreeLongPages is always fully populated from index 0 to index Header.FreeLongPageCount. Recycled pages are added and removed at the end of the arrays.

In some cases, a queue rather than a stack may be desired, particularly for free long pages. This is to prevent a reverse correlation between time and file position in some scenarios. Short pages used for short values might also benefit from being managed in a queue, though short pages used for other purposes may be kept in a stack. Page tables may be used to implement queues using two indices. This approach, however, will have a tendency to create unnecessarily deep page tables over long periods of time, such as if a file is used for days to implement a circular buffer. The depth should not become too large, although eliminating top pages that contain only one non-null reference and adjusting the indices as required would manage this scenario.

Header.NextShortPage and Header.NextLongPage may be used to indicate where fresh pages should be allocated. Short pages are allocated from Header.NextShortPage until Header.NextShortPage reaches a long page boundary. When this occurs, a new long page should be allocated, and short pages may be allocated from the new allocated long page. Long pages may be allocated from Header.NextLongPage. This is just the end of the file. In some cases, it may be desirable to coalesce free short pages into a free long page, which may be useful as a compaction tool.

In some embodiments, media file manager 208 may be arranged to write state information to a recovery log while building a virtual file in order to recover the virtual file in case of failure conditions, such as a power disruptions or system failures. The recovery log is written into long pages after the end of the virtual file (e.g., at Header.NextLongPage) as established in the current snapshot. A long page in the recovery log consists of a header in the first short page, a trailer in the last short page, and short data pages starting with the second short page. The recovery log should be managed to ensure it does not collide with unrecoverable writes to the virtual file. An example of a recover log header and recovery log trailer may be shown as follows:

```
typedef struct RecoveryLogHeader {
    GUID      Signature;         // Identifies a recovery log header
    ULONG     SequenceNumber;
    ULONG     ShortPageCount;    // Number of short pages in the page
                                 array
    ULONG     LongPageCount;     // Number of long pages in the page
                                 array
    BOOLEAN   Last;              // Indicates this is the last long page
                                 in the log
    PAGEREF   PageRefs[ ];       // A reference for each page in
                                 the array
} RecoveryLogHeader;
typedef struct RecoveryLogTrailer {
    GUID      Signature;         // Identifies a recovery log trailer
    ULONG     SequenceNumber;    // Must match the header's sequence
                                 number
} RecoveryLogTrailer;
```

For some page size combinations, the RecoveryLogHeader as described above might exceed the length of a short page. The probability for this scenario may be reduced or entirely prevented by, for example, disallowing such cases by constraining page sizes, using more than one short page for the recovery log header, and/or restricting the number of short pages per long page used for the log.

In some embodiments, media file manager 208 may implement various cache techniques to enhance performance. Media file manager 208 may partition a virtual file into one or more long pages and short pages, write a portion of the long pages and short pages to a cache, and access the cached pages with multiple threads. In one embodiment, for example, the cache may be shared between processes using named shared memory. Cached pages may be assigned one of four states: (1) Clean; (2) Dirty; (3) Snapshot; and (4) Snapshot ghost. In addition, some pages are recoverable while others are not depending on which part of the file they come from. For example, all long pages are typically unrecoverable. Short pages are typically recoverable unless there are scenarios in which short pages will be written at high frequency and recovery is not required for them.

For all pages, initial states for the pages may be defined in accordance with three rules: (1) all pages read from disk start out clean; (2) all newly-created pages start out dirty; and (3) clean pages that are locked for write, not written to, and then unlocked, are left clean. The commit to disk procedure occurs concurrently with client read/write activity. Unrecoverable pages may be committed at a higher frequency than recoverable pages, but unrecoverable pages should be committed whenever recoverable pages are committed.

A process for committing unrecoverable pages may be accomplished as follows. For example, all (unrecoverable) dirty pages become snapshot. Snapshot pages are treated like clean pages except that when they are written to, a copy is made, the copy is dirty and the original is snapshot ghost. Snapshot and snapshot ghost pages are written to their respective places in the file. Snapshot ghost pages are flushed. Snapshot pages become clean.

A process for committing all pages may be accomplished as follows. All dirty pages become snapshot. Snapshot pages are treated like clean pages except that when they are written to, a copy is made, the copy is dirty and the original is snapshot ghost. The dirty copies are exposed out of the cache for IOs rather than their snapshot ghost versions. Unrecoverable snapshot and unrecoverable snapshot ghost pages are written to their respective places in the file. Recoverable snapshot and recoverable snapshot ghost pages are written to the recovery log. Recoverable snapshot and recoverable snapshot ghost pages are written to their respective places in the file. Snapshot ghost pages are flushed. Snapshot pages become clean. The recovery log is flushed.

In some embodiments, media file manager 208 may implement various concurrency rules to prevent collisions. Media file manager 208 may partition a virtual file into multiple resources each having a lock, and read media information from the virtual file by multiple applications using the resource locks. The concurrency rules implemented in the allocation layer are intended to achieve the highest degree of independence between the various file readers, file writers and disk input/output (I/O). The cache may be used to communicate between readers and writers, and also to isolate readers and writers from disk I/O.

A virtual file may be partitioned into various "file resources." For example, file resources may include: (1) a header; (2) short page allocation; (3) long page allocation; (4) root container expansion; (5) root container access; (6) value expansion (e.g., per value); and (7) value access (e.g., per value). Each resource may have its own lock. Most locks are taken and released in a single call to the allocation layer. The exception is "value access" and "value expansion." The allocation layer API should allow the application to lock these resources explicitly across many calls to the allocation layer. Various dependency rules may be established to determine what resources may be locked by a given consumer when other resources are locked. These rules prevent cycles that would otherwise deadlock the allocation layer. These rules also allow the "application layer" to enforce semantics on the NVP values by preventing readers from reading the content before it is all there.

Most resources can be locked in one of two ways: (1) read lock; (2) write lock. The locking rules are as follows: (1) any number of readers can share a resource with zero writers; and (2) a write lock is exclusive of all other locks.

In some cases, locks are taken by the block layer code for short intervals to assure coherency of NVPs, page tables, allocation tables, and so forth. In other cases, locks are taken over intervals determined by calls to the block layer API under the control of the application.

Read locks are taken by readers over intervals during which data and semantic coherency of the resource in question must be maintained in order for a series of correlated read operations to succeed. No reads are attempted without taking a read lock. Write locks are taken by writers over intervals in which a series of correlated write operations are to occur to maintain the coherency of a resource. No writes are attempted without taking a write lock In order to allow readers to read from a file resource while a writer is writing to that same file resource, writers keep a set of private dirty pages while they have a given resource locked. Readers do not see these dirty pages until the writer commits them in the process of releasing the write lock. The data is not necessarily committed when the writer releases a writer lock. It is fine for the writer to make a number of writes (locking and unlocking each time) without committing. Only a single writer is allowed at one time in the absence of a general way to merge the dirty pages produced concurrently by two writers. Commit locks may be reduced or eliminated if the dirty pages are versioned.

To assure coherency across multiple file resources, the allocation layer should guarantee to readers that committed changes will never go out to the disk out of order. The cache should reduce this type of problem. The pages can be committed out of order, but as long as they remain in the cache, in order, the reader can get their content in the correct order. When writes are committed, events may need to be thrown so that readers can be informed of value changes.

Application Program Interface Layer

Various embodiments may further include an API layer including an API software library of software objects interoperable with corresponding defined API commands to support the above-referenced file allocation layer. The API layer may allow various custom applications to utilize the file allocation scheme implemented using media file manager 208. The API layer may be used in conjunction with media file manager 208, separate from media file manager 208, or in lieu of media file manager 208, as desired for a given implementation.

In general, an API is a computer process or technique that allows other processes to work together. In the familiar setting of a personal computer running an operating system and various applications such as MICROSOFT WORD®, an API allows the application to communicate with the operating system. An application makes calls to the operating system API to invoke operating system services. The actual code behind the operating system API is located in a collection of dynamic link libraries (DLLs).

Similar to other software elements, an API can be implemented in the form of computer executable instructions whose services are invoked by another software element. The computer executable instructions can be embodied in many different forms. Eventually, instructions are reduced to machine-readable bits for processing by a computer processor. Prior to the generation of these machine-readable bits, however, there may be many layers of functionality that convert an API implementation into various forms. For example, an API that is implemented in C++ will first appear as a series of human-readable lines of code. The API will then be compiled by compiler software into machine-readable code for execution on a processor, such as processing unit 202, for example.

The proliferation of different programming languages and execution environments have brought about the need for additional layers of functionality between the original implementation of programming code, such as an API implementation, and the reduction to bits for processing on a device. For example, a computer program initially created in a high-level language such as C++ may be first converted into an intermediate language such as MICROSOFT® Intermediate Language (MSIL). The intermediate language may then be compiled by a Just-in-Time (JIT) compiler immediately prior to execution in a particular environment. This allows code to be run in a wide variety of processing environments without the need to distribute multiple compiled versions. In light of the many levels at which an API can be implemented, and the continuously evolving techniques for creating, managing, and processing code, the embodiments are not limited to any particular programming language or execution environment.

Figure 8:
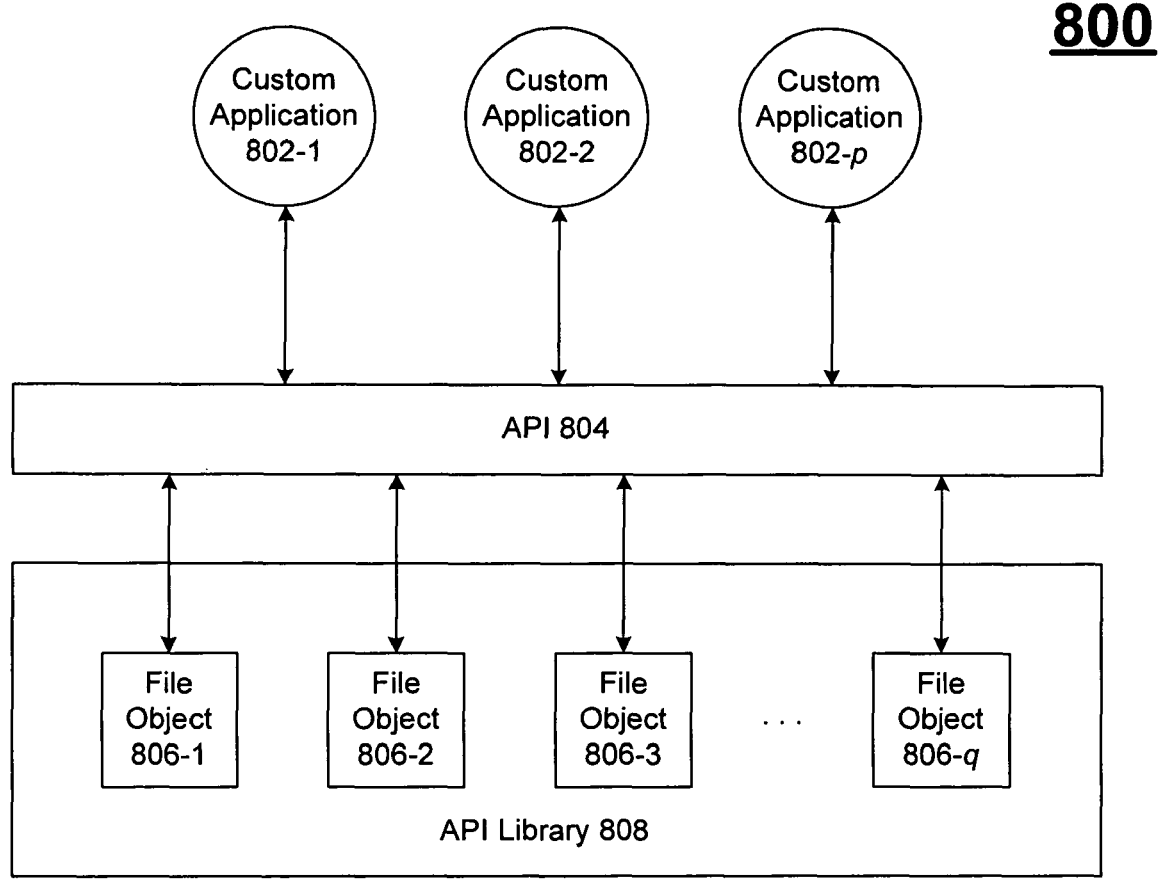
FIG. 8 illustrates an exemplary embodiment of a logical diagram for an application program interface.

FIG. 8 illustrates a logical diagram for a software architecture 800. Software architecture 800 may illustrate various software elements arranged to implement and/or use the file allocation scheme described with reference to FIGS. 1-7. As shown in FIG. 8, software architecture 800 may include various custom applications 802-1-$p$, API layer 804, and an API software library 808. API software library 808 may include multiple file objects 806-1-$q$. It may be appreciated that software architecture 800 may include more or less software elements as desired for a given implementation.

Custom applications 802-1-$p$ may comprise any application software, application hardware, or combination of both, designed to interact or utilize the file allocation scheme as previously described. An example of a custom application 802 may include media application 206. Media application 206 may further include a media application reader (MAR) 206$a$ and a media application writer (MAW) 206$b$.

Custom applications 802-1-$p$ may be programmed or designed to use various API commands as defined by API layer 804. The various defined API commands (and associated parameters) of API layer 804 give access to API software library 808. API software library 808 may include various software objects, referred to herein as file objects 806-1-$q$. Custom applications 802-1-$p$ may use one or more API commands to invoke one or more corresponding file objects 806-1-$q$ to perform a specific set of file related functions. A set of API commands and corresponding file objects 806-1-$q$ will be explained in further detail later.

In various embodiments, one or more custom applications 802-1-$p$ may access, manipulate, or otherwise interact with a virtual file using one or more API commands that correspond or invoke one or more file objects 806-1-$q$ of API software library 808. File objects 806-1-$q$, and any other elements identified as an object in the illustrations and accompanying description, are discrete units of software typically generated using object-oriented programming techniques. In some cases, custom applications 802-1-*p*, API layer 804, and/or the various API commands can be implemented as one or more objects. Many object types are available and widely used in the industry, and the particular object types may vary as desired for a given implementation. It is worthy to note that functions described herein and in the claims as accomplished by an object may also be achieved through multiple objects designed to interface with each other. The embodiments are not limited in this context.

More particularly, file objects 806-1-*q* may represent discrete units of software arranged to perform various file related operations needed to implement one or more aspects of the media file allocation scheme as previously described. In various embodiments, API layer 804 and API software library 808 may be designed to model various media file allocation functions, methods, or procedures. For example, API layer 804 and API software library 808 may model or support such functions as supporting signatures and versions in the file header for a virtual file, defining and retrieving allocation statistics regarding a virtual file, supporting a hierarchy of NVPs in a virtual file (including the ability to create and delete NVPs), generating short and long values (modeled as virtual files), the ability to zero ranges in a short or long value, the explicit locking of short and long values for reading and writing, subscribing to events indicating when values have changed, and other functions as well. The embodiments are not limited in this context.

In various embodiments, one or more file objects 806-1-*q* may comprise an instance of a specific class. One class, for example, might contain objects that provide services for creating a file, while another class might contain objects for reading data from the file, and yet another class might contain objects for writing data to a file. Typically, a programmer knows an object's class prior to running an instance of that object. The class of an object is looked up in a class library, such as API software library 808 or a sub-set thereof. Such a library has access to a directory of all available classes of objects. A client application can call a function in a library specifying the class of object it wants and the first supported interface to which it wants a pointer. The library then causes a server application that implements an object of that class to start running. The library also passes back to the initiating client application a pointer to the requested interface on the newly instantiated object. The client can then ask the object directly for pointers to any other interfaces the object supports.

Interfaces supported by objects are generally thought of as a contract between the object and its clients. The object promises to support the interface's methods as the interface defines them, and the client applications promise to invoke the methods correctly. Thus, an object and the clients must agree on a way to explicitly identify each interface, a common way to describe, or define, the methods in an interface, and a concrete definition of how to implement an interface. Objects can therefore be described in terms of the interface parameters that they inherit, as well as the class parameters that they inherit. Where a class of objects has a function for writing data to a file, for example, an instance that inherits the class will also be able to write data to a file, as well as any additional features and functions provided in the instance. Where a class supports a particular interface, an instance of the class inherits the "contract" and therefore also supports the interface. The objects through which various aspects of the embodiments are implemented generally conform to these programming principles and understandings of the definitions for objects, classes, inheritance, and interfaces. It should be clear, however, that modifications and improvements to object-oriented programming techniques are constantly occurring, and the embodiments are not limited to objects of a particular type or with any specific features. The API provided can be implemented through objects of any kind now in use or later developed.

In one embodiment, for example, API layer 804 may include an interface ISAL class. In accordance with the interface ISAL class, API layer 804 may receive a file create command to create a virtual file. A file create object may create the virtual file with a file handle in response to the file create command. The file create object may return the file handle for the virtual file to the calling application 802. Similarly, an open file command may be used to open a given virtual file. An example of an interface ISAL class and accompanying API commands may be shown as follows:

```
object,
uuid (397656E0-B3E6-436f-88B4-2BC63DB775D7),
pointer_default(unique),
local
interface ISAL : IUnknown
{
HRESULT
CreateFile (
    [in]              LPCWSTR     szFilename,
    [in]              DWORD       dwSharing,
    [in]              DWORD       dwCreation,
    [in]              ULONG       cSids,
    [in,size_is(cSids)] PSID *    ppSids,
    [in]              REFGUID     AppSig,
    [in]              DWORD       AppVer,
    [out]             ISALFile ** ppFile
);
HRESULT
OpenFile (
    [in]              LPCWSTR     szFilename,
    [in]              DWORD       dwSharing,
    [in]              ULONG       cSids,
    [in,size_is(cSids)] PSID *    ppSids,
    [out]             ISALFile**  ppFile
);
};
```

In one embodiment, for example, API layer 804 may include an interface ISALFile class. In accordance with the interface ISALFile class, API layer 804 may receive a get file information command, and return file information for a virtual file in response to the get file information command. The interface ISALFile class may also include a get root container command, and send a list of NVPs from a root container. An example of an interface ISALFile class and accompanying API commands may be shown as follows:

```
cpp_quote ("// {AE03A0A5-DE98-45ff-8016-DDEFF70BCF61}")
cpp_quote ("DEFINE_GUID(CLSID_SAL,")
cpp_quote ("0xae03a0a5, 0xde98, 0x45ff, 0x80, 0x16, 0xdd, 0xef, 0xf7, 0xb, 0xcf, 0x61);")
typedef struct {
    GUID        SALSignature;     // Identifies the format at this layer
```

-continued

```
GUID         ApplicationSignature;  // Identifies the format at the next layer
ULONG        SALVersion;            // The version of the format at this layer
ULONG        ApplicationVersion;    // The version of the format at the next layer
ULONG        ShortPageSize;         // Short page size in bytes.
ULONG        LongPageSize;          // Long page size in bytes.
ULONGLONG    RootContainerSize;     // Length of the root container in bytes.
ULONG        FreeShortPageCount;    // Number of pages in the FreeShortPages table
ULONG        FreeLongPageCount;     // Number of pages in the FreeLongPages table
PAGEREF      FirstFreeShortPage;    // The next short page to be allocated
PAGEREF      FirstFreeLongPage;     // The next long page to be allocated
} SAL_FILE_INFO ;
object,
uuid (DE5A3D59-7A4E-47bb-9B26-352A40531921),
pointer_default(unique)
interface ISALFile : IUnknown
{
HRESULT
  GetFileInfo (
  [out] SAL_FILE_INFO * pFileInfo
  ) ;
HRESULT
  OpenRootContainer (
  [out] ISALContainerReader ** ppContainer
  ) ;
};
```

In one embodiment, for example, API layer 804 may include an interface ISALContainerReader class. In accordance with the interface ISALContainerReader class, API layer 804 may receive a container read command, and read a NVP from a container. The interface ISALContainerReader class may also include a read lock acquire command, a read lock release command, a get resident value command, a get value command, and a get container command. An example of an interface ISALContainerReader class and accompanying API commands may be shown as follows:

```
object,
uuid (57950673-5697-4f30-94F9-9F05E4B5E966),
pointer_default(unique)
interface ISALContainerReader : IUnknown
{
HRESULT
AcquireReadLock ( );
HRESULT
ReleaseReadLock ( );
HRESULT
OpenNVPByName (
       [in]       PROPVARIANT *      pName,
       [out]      ISALNVPReader **   ppNVPReader
);
HRESULT
OpenNVPByIndex (
       [in]       ULONG              Index,
       [out]      ULONGLONG *        pValueSize,
       [out]      PROPVARIANT *      pName,
       [out]      ISALNVPReader **   ppNVPReader
);
HRESULT
GetNVPCount (
       [out       ULONG *            pcNVPs
);
};
```

In one embodiment, for example, API layer 804 may include an interface ISALContainerWriter class. In accordance with the interface ISALContainerWriter class, API layer 804 may receive a container write command, and write a NVP to a container. The interface ISALContainerWriter class may also include a write lock acquire command, a commit changes and release write lock command, a discard changes and release write lock command, a set resident value command, a clear value command, a set short value command, a set long value command, and a create container command. An example of an interface ISALContainerWriter class and accompanying API commands may be shown as follows:

```
object,
uuid (90E71790-57E1-47c3-9E2C-8A4A975A77B4),
pointer_default(unique)
interface ISALContainerWriter : ISALContainerReader
{
HRESULT
AcquireWriteLock ( ) ;
HRESULT
Commit ( ) ;
HRESULT
ReleaseWriteLock ( ) ;
HRESULT
CreateNVP (
       [in]       PROPVARIANT *      pName,
       [in]       ULONGLONG          ValueSize,
       [out]      ISALNVPWriter **   pNVPWriter
) ;
};
```

In one embodiment, for example, API layer 804 may include an interface ISALNVPReader class. In accordance with the interface ISALNVPReader class, API layer 804 may receive a value reader command, and read a short value or a long value from a container. The interface ISALNVPReader class may also include an is long command, a get length command, a read lock acquire command, read lock release command, and a copy from command. An example of an interface ISALNVPReader class and accompanying API commands may be shown as follows:

```
object,
uuid (F821DCDC-E279-46eb-B012-24059B4311CA),
pointer_default(unique)
```

-continued

```
interface ISALNVPReader : IUnknown
{
HRESULT
AcquireReadLock ();
HRESULT
ReleaseReadLock ();
HRESULT
CopyFrom (
        [in]            ULONGLONG       ValueOffset,
        [in]            ULONG           cb,
        [out]           BYTE *          pb
);
HRESULT
GetValueSize (
        [out]           ULONGLONG *     pValueSize
);
};
```

In one embodiment, for example, API layer 804 may include an interface ISALNVPWriter class. In accordance with the interface ISALNVPWriter class, API layer 804 may receive a value writer command, and write a short value or a long value to a container. The interface ISALNVPWriter class may also include a write lock acquire command, a commit changes and release write lock command, a discard changes and release write lock command, a copy to command, a set length command, a retire to offset command, and a retire range command. An example of an interface ISALNVPWriter class and accompanying API commands may be shown as follows:

```
object,
uuid (8B19572D-DE92-4fb3-9680-E576FFF1A739),
pointer_default(unique)
interface ISALNVPWriter : ISALNVPReader
{
HRESULT
AcquireWriteLock ( ) ;
HRESULT
Commit ( );
HRESULT
ReleaseWriteLock ( ) ;
HRESULT
CopyTo (
        [in]            ULONGLONG       ValueOffset,
        [in]            ULONG           cb,
        [in]            BYTE *          pb
);
HRESULT
RetireToOffset (
        [in]            ULONGLONG       ullEndOffset
);
};
```

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a machine-readable storage medium containing instructions that if executed enable a system to:
    store multiple media streams in a virtual file using a hierarchy of name-value pairs, wherein:
        said virtual file is partitioned into one or more long pages of a first defined length,
        at least one long page of said virtual file is partitioned into one or more short pages of a second defined length shorter than said first defined length,
        said hierarchy of name-value pairs is formed by storing multiple name-value pairs for said virtual file in one or more containers within said pages,
        said containers include a root container comprising a first page table structure implemented as an array of short pages storing a collection of high-level name-value pairs for said virtual file at a high level of said hierarchy, and
        at least one high-level name-value pair stored in said first page table structure of said root container comprises a value representing another container comprising a second page table structure implemented as an array of long pages or short pages storing more values name-value pairs for said virtual file at a lower level of said hierarchy;

receive an application program interface command corresponding to a software object from a software library; and access at least one container of said virtual file storing name-value pairs for said virtual file in response to said application program interface command.

2. The article of claim 1, further comprising instructions that if executed enable the system to receive a file create command to create said virtual file, create said virtual file with a file handle in response to said file create command, and send said file handle for said virtual file.

3. The article of claim 1, further comprising instructions that if executed enable the system to receive a get file information command, and send file information for said virtual file in response to said get file information command.

4. The article of claim 1, further comprising instructions that if executed enable the system to receive a get root container command, and send a list of name-value pairs from a root container.

5. The article of claim 1, further comprising instructions that if executed enable the system to receive a container read command, and read a name-value pair from a container.

6. The article of claim 1, further comprising instructions that if executed enable the system to receive a container write command, and write a name-value pair to a container.

7. The article of claim 1, further comprising instructions that if executed enable the system to receive a value reader command, and read a short value or a long value from a container.

8. The article of claim 1, further comprising instructions that if executed enable the system to receive a value writer command, and write a short value or a long value to a container.

9. The article of claim 1, further comprising instructions that if executed enable the system to receive a read lock command, and lock a short value or a long value for reading.

10. The article of claim 1, further comprising instructions that if executed enable the system to receive a write lock command, and lock a short value or a long value for writing.

11. An apparatus comprising a media processing sub-system having a processor and a memory, said memory storing an application program interface software library having multiple software objects, said processor to execute said software objects in response to application program interface commands in order to manage a virtual file comprising a hierarchy of name-value pairs used to store media content from multiple media streams, wherein:

said virtual file is partitioned into one or more long pages of a first defined length, at least one long page of said virtual file is partitioned into one or more short pages of a second defined length shorter than said first defined length, said hierarchy of name-value pairs is formed by storing multiple name-value pairs for said virtual file in one or more containers within said pages, said containers include a root container comprising a first page table structure implemented as an array of short pages storing a collection of high-level name-value pairs for said virtual file at a high level of said hierarchy, at least one high-level name-value pair stored in said first page table structure of said root container comprises a value representing another container comprising a second page table structure implemented as an array of long pages or short pages storing more name-value pairs for said virtual file at a lower level of said hierarchy, and one or more of said software objects access at least one container of said virtual file storing name-value pairs for said virtual file in response to a corresponding application program interface command.

12. The apparatus of claim 11, said application program interface software library including at least one of a file create object responsive to a file create command, a file information object responsive to a get file information command, a root container object responsive to a get root container command, a container read object responsive to a container read command, a container write object responsive to a container write command, a value reader object responsive to a value reader command, a value writer object responsive to a value writer command, a read lock object responsive to a read lock command, or a write lock object responsive to a write lock command.

13. The apparatus of claim 11, comprising a media application reader to read a name-value pair from said virtual file using said application program interface software library.

14. The apparatus of claim 11, comprising a media application writer to write a name-value pair to said virtual file using said application program interface software library.

15. The apparatus of claim 11, comprising a media file manager to manage said virtual file.

16. A computer-implemented method, comprising:

receiving an application program interface command at a computer, said application program interface command corresponding to a software object from a software library stored in memory of said computer; and accessing a virtual file with media information for multiple media streams stored on said computer with said software object, wherein:

said virtual file is partitioned into one or more long pages of a first defined length, at least one long page of said virtual file is partitioned into one or more short pages of a second defined length shorter than said first defined length, said virtual file comprises a hierarchy of name-value pairs formed by storing multiple name-value pairs in one or more containers within said pages, said containers include a root container comprising a first page table structure implemented as an array of short pages storing a collection of high-level name-value pairs for said virtual file at a high level of said hierarchy, at least one high-level name-value pair stored in said first page table structure of said root container comprises a value representing another container comprising a second page table structure implemented as an array of long pages or short pages storing more name-value pairs for said virtual file at a lower level of said hierarchy, and said software object accesses at least one container of said virtual file storing name-value pairs for said virtual file in response to said application program interface command.

17. The method of claim 16, comprising writing media information to said virtual file with a first software object from said software library.

18. The method of claim 17, comprising reading media information from said virtual file with a second software object from said software library.

19. The method of claim 18, comprising creating said virtual file with a third software object from said software library.

20. The method of claim 19, comprising creating said name-value pair with a fourth software object from said software library.

* * * * *

UNITED STATES PATENT AND TRADEMARK OFFICE
CERTIFICATE OF CORRECTION

PATENT NO. : 7,783,686 B2
APPLICATION NO. : 11/454409
DATED : August 24, 2010
INVENTOR(S) : Matthijs A. Gates et al.

Page 1 of 1

It is certified that error appears in the above-identified patent and that said Letters Patent is hereby corrected as shown below:

In column 20, line 65, in Claim 1, after "more" delete "values".

Signed and Sealed this
Nineteenth Day of July, 2011

David J. Kappos
*Director of the United States Patent and Trademark Office*